US006856739B2

(12) United States Patent
Zhang et al.

(10) Patent No.: US 6,856,739 B2
(45) Date of Patent: Feb. 15, 2005

(54) OPTICAL FIBER FOR RESISTING HYDROGEN-INDUCED LOSS

(75) Inventors: Ying Hua Zhang, Sharon, MA (US); Brian M. Laliberte, Winchester, MA (US); Alexander Yusim, Boston, MA (US)

(73) Assignee: JDS Uniphase Corporation, San Jose, CA (US)

( * ) Notice: Subject to any disclaimer, the term of this patent is extended or adjusted under 35 U.S.C. 154(b) by 148 days.

(21) Appl. No.: 10/289,144

(22) Filed: Nov. 6, 2002

(65) Prior Publication Data

US 2003/0099455 A1 May 29, 2003

Related U.S. Application Data

(60) Provisional application No. 60/345,925, filed on Nov. 7, 2001.

(51) Int. Cl.$^7$ .................................. G02B 6/02
(52) U.S. Cl. ........................ 385/123; 385/124
(58) Field of Search ................ 385/123–127, 385/141–145; 372/6, 70

(56) References Cited

U.S. PATENT DOCUMENTS

| | | | |
|---|---|---|---|
| 3,791,714 A | 2/1974 | Maurer | 350/96 |
| 4,389,230 A | 6/1983 | Modone et al. | 65/3.12 |
| 4,445,918 A | 5/1984 | Modone et al. | 65/3.12 |
| 4,596,589 A | 6/1986 | Perry | 65/3.12 |
| 4,685,945 A | 8/1987 | Freund | 65/4.21 |
| 4,770,494 A | 9/1988 | Csencsits et al. | 350/96.34 |
| 5,059,229 A | 10/1991 | Blankenship et al. | 65/2 |
| 5,274,734 A | * 12/1993 | Jin et al. | 385/142 |
| 5,282,079 A | * 1/1994 | Laming et al. | 372/6 X |
| 5,692,087 A | 11/1997 | Partus et al. | 385/123 |
| 6,115,524 A | * 9/2000 | Burke et al. | 385/123 |
| 6,201,917 B1 | * 3/2001 | Campion et al. | 385/123 |
| 6,220,060 B1 | 4/2001 | Wisk et al. | 65/435 |

FOREIGN PATENT DOCUMENTS

| | | | |
|---|---|---|---|
| EP | 0 673 895 A2 | 9/1995 | C03C/25/00 |
| EP | 0 673 895 A3 | 1/1996 | C03C/25/00 |
| JP | 58-055341 | 4/1983 | C03B/37/00 |
| JP | 58-060635 | 4/1983 | C03B/37/00 |
| JP | 61-132531 | 6/1986 | C03B/37/014 |
| JP | 07-277770 | 10/1995 | C03C/13/04 |

OTHER PUBLICATIONS

A. Tomita & P.J. Lemaire, "Hydrogen–Induced Loss Increases in Germanium–Doped Single–Mode Optical Fibers: Long–Term Predictions", Electronics Letters, Jan. 17$^{th}$ 1985, vol. 21, No. 2, pp. 71–72.

(List continued on next page.)

*Primary Examiner*—Phan T. H. Palmer
(74) *Attorney, Agent, or Firm*—Allen, Dyer, Doppelt, Milbrath & Gilchrist, P.A.

(57) ABSTRACT

The invention provides an optical fiber composition which has a high resistance to aging upon exposure to hydrogen. The inventive optical fiber does not require further treatment steps, such as passivation or hermetic coating, to meet specifications for hydrogen aging. The inventive optical fiber has a core glass composition with a germania doping concentration from 0% to 4% in weight. Decreasing the dopant concentration of germanium increases the resistance of the fiber to hydrogen by reducing the number of germanium defect sites in the core of the fiber. The optical fiber composition is advantageous for rare earth-doped fibers which are particularly sensitive to hydrogen aging.

19 Claims, 4 Drawing Sheets

OTHER PUBLICATIONS

P.J. Lemaire et al., "Hydrogen–induced loss increases in hermetic and non–hermetic erbium–doped amplifier fibers", OFC/IOOC '93 Technical Digest TuL3; pp. 53–54.

P.J. Lemaire et al., "Hydrogen–induced–loss increases in erbium–doped amplifier fibers: revised predictions"; OFC '94 Technical Digest FF1; pp. 301–302.

P.J. Lemaire et al., "Prediction of Long–Term Hydrogen–Induced Loss Increases in Er–Doped Amplifier Fibers", IEEE Photonics Technology Letters, vol. 5, No. 2, 1993, pp. 214–217.

P.J. Lemaire et al., "Reliability of optical fibers exposed to hydrogen: prediction of long–term loss increases"; Optical Engineering, vol. 30, No. 6, 780, 1991.

J. Stone & C.A. Burrus, "Reduction of the 1.38 $\mu$m Water Peak in Optical Fibers by Deuterium–Hydrogen Exchange", The Bell System Technical Journal, vol. 59, No. 8, Oct. 1980, pp. 1541–1548.

M.J. LuValle et al., "Kinetic modeling of hydrogen induced degradation in erbium doped fiber amplifiers", SPIE vol. 3848, pp. 260–270, Part of the SPIE Conference on Optical Fiber Reliability and Testing, Boston, Massachusetts, Sep. 1999.

E. Modone & G. Roba; "OH reduction in preforms by isotope exchange"; Electronics Letters; vol. 17 (21), pp. 815–817, (1981).

Kinoshita, "Broadband Fiber Optic Amplifiers", Optical Fiber Communication Conference, Mar. 20, 2001, TuA1–1–TuA1–5.

Bellcore GR–1312–Core, Issue 3, Apr. 1999, Section 8.1.3.

* cited by examiner

OPTICAL FIBER FOR RESISTING HYDROGEN-INDUCED LOSS

CROSS-REFERENCE TO RELATED APPLICATIONS

This applications claims priority of U.S. Provisional Patent Application No. 60/345,925 filed on Nov. 7, 2001, entitled "Er doped fiber for high gain with high hydrogen resistance" which is incorporated herein by reference for all purposes.

MICROFICHE APPENDIX

Not Applicable

FIELD OF THE INVENTION

The present invention generally relates to the field of optical fibers and in particular to optical fibers for resisting hydrogen-induced loss.

BACKGROUND OF THE INVENTION

Optical fibers are widely used in the field of telecommunications for transmitting signals. They essentially comprise an inner cylindrical region, called a core, within which a signal is transmitted, and an outer region surrounding the core, called cladding. The refractive index of the cladding region is lower than that of the core region, so as to confine the transmitted signal within the core region.

Typically, both the core and the cladding are made from silica glass material. The difference in refractive index between the core and the cladding is obtained by incorporating suitable additives, so called dopants, into the glass matrix of the core and/or cladding.

Typical examples of dopants used for modifying the refractive index of silica are germanium, aluminum and phosphorous, which increase its refractive index, and fluorine or boron, which decreases its refractive index.

If desired, the core of optical fibers can be further doped with particular substances capable of giving effects of optical amplification, such as rare earth ions. Rare earth ions have spectroscopic properties that are particularly suitable for the purpose. Among rare earths, erbium is the most frequently used component since its fluorescence spectrum has a band ranging between 1420 and 1650 nm, which corresponds to the third transmission window, centered at about 1550 nm, of a telecommunication signal.

As of late, there has been an increased interest in hydrogen induced losses in optical fibers. This is attributed to hydrogen reactions occurring at germaniun-related defect sites created during the addition of germanium as a dopant; A. Tomita & P. J. Lemaire, Electronics Letters, $17^{th}$ Jan. 1985, Vol. 21, No. 2, pp. 71–72. Lemaire et al. disclosed in OFC/IOOC '93 Technical Digest TuL3 that such hydrogen induced losses do not usually constitute a problem for single mode fibers, however, they are of potential concern for highly doped fibers used in erbium doped fiber amplifiers (EDFA). AT&T Bell Laboratories first discovered that erbium doped fiber is susceptible to long-term degradation caused by hydrogen induced loss increases in installed optical fibers. In 1993, Lemaire et al. (OFC/IOOC '93 Technical Digest TuL3) confirmed that typical erbium doped fiber compositions were highly reactive when exposed to even low levels of ambient hydrogen. Erbium-doped fibers made by different manufacturers using different processing techniques showed that this high reactivity is inherent in the most widely used erbium-doped fiber compositions based on $GeO_2$—$Al_2O_3$ co-doped host. This potential reliability problem is recognized and addressed in Telcordia requirements. For example, Telcordia specification (Bellcore GR-1312-Core, Issue 3, April 1999) per Section 8.1.3 of GR-1312-core requires the demonstration of 20 years of product life at 0.01 atm of hydrogen at 38° C. Therefore, reducing hydrogen aging is important for erbium-doped fibers and their use in EDFAs.

Rare earth ions, such as erbium, are of special interest because they can provide gain in the low loss window of long haul transmission fiber. Due to the nature of the erbium atom, the gain provided in this window is not flat, rather, it has a particular gain shape which is undesirable. In order to achieve gain flatness, gain-flattening filters are used successfully. One environmental concern for amplifiers that use erbium-doped fiber is exposure to hydrogen. Hydrogen can diffuse into the fiber core region where it can react with germanium and silicon defect centers to form OH groups, which cause optical loss in the wavelength region of interest. For erbium-doped fiber, this effect can cause the gain shape of the fiber to change and render the gain flattening filter useless for the application.

The state of the art discloses several approaches to reduce hydrogen aging problems. Hermetic fiber coating and deuterium passivation are two of the most widely accepted methods for reducing such hydrogen induced losses. However, these methods of reducing hydrogen-induced loss require further process time and costs.

It is an object of this invention to provide an optical fiber that has an improved resistance to hydrogen-induced optical loss.

Another object of this invention is to provide an optical fiber that has improved resistance to hydrogen-induced loss without prior passivation.

It is a further object of the invention to provide an erbium-doped fiber with improved gain and improved resistance to hydrogen-induced optical loss.

SUMMARY OF THE INVENTION

In accordance with the invention there is provided, an optical fiber comprising a core region, said core region comprising silica as a major component and at least a first dopant, wherein said first dopant is germania ($GeO_2$) comprising a quantity of substantially 0% to 4% in weight; and a cladding region surrounding said core region, said cladding region being composed of silica as a major component.

In accordance with another embodiment of the invention, the core region further comprises at least a second dopant. The second dopant can be alumina or a rare earth. If desired, both alumina and a rare earth are used as dopants. Rare earth ions are used as a dopant for providing an optical amplification.

In a further embodiment of the invention, the cladding region comprises at least a first dopant. The first dopant of the cladding is fluorine (F) or phosphorous ($P_2O_5$). If desired, the cladding is a matched cladding comprising fluorine and phosphorous as dopants.

In another embodiment of the invention, a cladding diameter to a core diameter is larger than 4 to 3.

In accordance with yet a further embodiment of the invention, the core region further comprises water. Advantageously, the amount of water is at a quantity of approximately 4.5 ppm to 5.5 ppm.

In accordance with the invention, there is further provided, an optical fiber for resisting a hydrogen-induced loss comprising a silica glass cladding; and a glass core doped with at least a first dopant, said first dopant is germania having a dopant concentration from approximately 0% to 4% in weight.

In accordance with another aspect of the invention, there is provided, an optical fiber for resisting a hydrogen-induced loss comprising a) a core comprising silica ($SiO_2$), germania ($GeO_2$) at a quantity of up to approximately 4% in weight, and alumina ($Al_2O_3$); and b) a matched cladding formed around the core comprising silica doped with fluorine (F) and phosphorous ($P_2O_5$). In an embodiment of the invention, the core comprises alumina at a quantity of less than 12% in weight. Hence, in accordance with the amount of dopants in the core, the core comprises varying amounts of silica at a quantity of at least approximately 84% in weight.

If desired, the core further comprises a rare earth dopant for providing optical amplification. In accordance with an embodiment of the present invention, the rare earth dopant is erbium oxide ($Er_2O_3$) at a quantity of approximately 1500 to 2000 ppm.

In another embodiment of the invention, a matched cladding diameter to a core diameter is larger than 4 to 3.

BRIEF DESCRIPTION OF THE DRAWINGS

Exemplary embodiments of the invention will now be described in conjunction with the following drawings wherein like numerals represent like elements, and wherein.

DETAILED DESCRIPTION OF THE PREFERRED EMBODIMENTS

Erbium-doped fibers were shown to have a sensitivity to hydrogen which is accelerated by both, temperature and partial pressure of hydrogen; M. J. LuValle et al., "Kinetic modeling of hydrogen induced degradation in erbium doped fiber amplifiers", SPIE Vol. 3848, pp. 260–270, Part of the SPIE Conference on Optical Fiber Reliability and Testing, Boston, Mass., September 1999. As disclosed by Jin et al. in U.S. Pat. No. 5,274,734, silica-based optical fibers that are doped with Ge, Al and a rare earth (e.g., Er) can be susceptible to hydrogen-induced attenuation change. Jin et al. state that such fiber can exhibit loss increase rates that are, at 20° C., $10^6$ times larger than those of a standard single mode fiber. Further, they suggest that transition metal-doped silica-based fibers can exhibit large hydrogen-induced attenuation change. In many circumstances (e.g., amplifier fiber, attenuator fiber) a significant attenuation change of optical fiber is undesirable.

Figure 1:
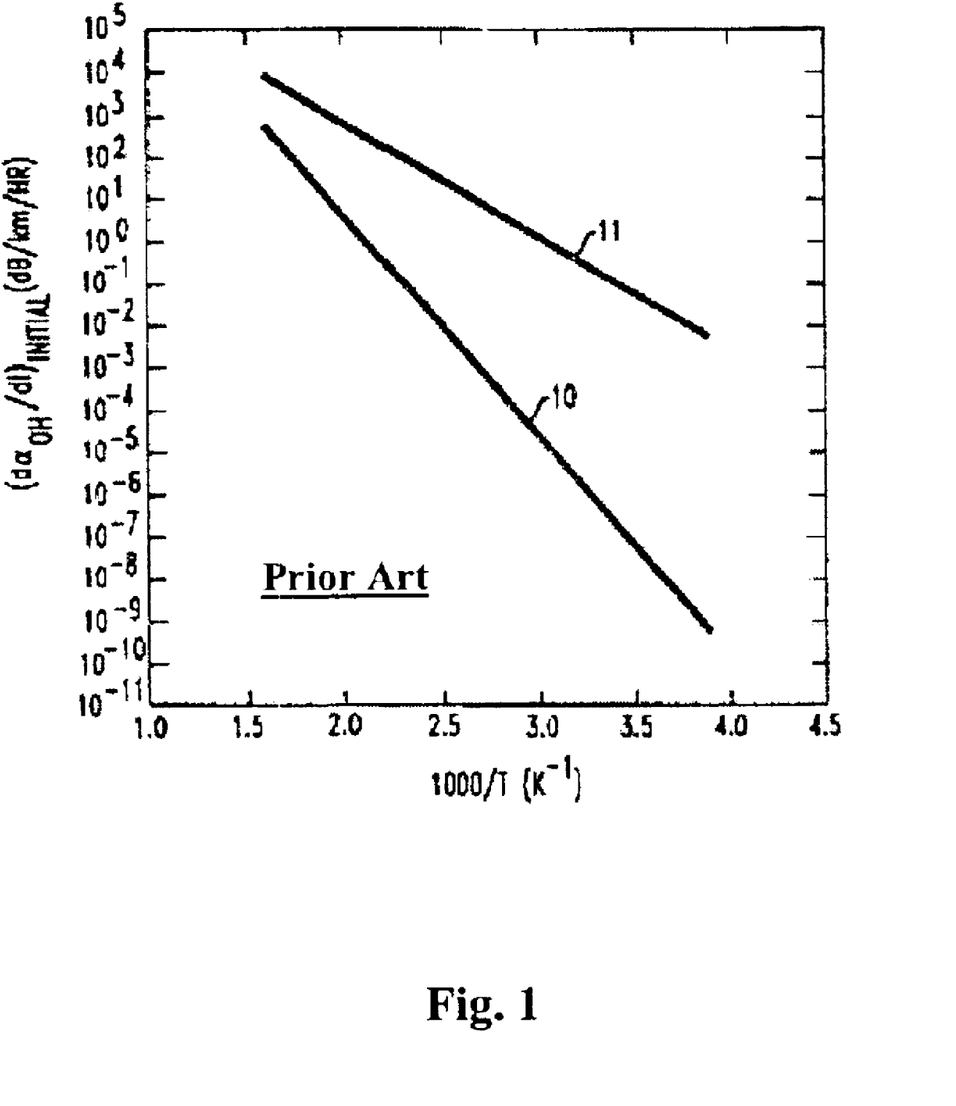
FIG. 1 shows prior art data that illustrate the large difference between conventional silica-based fiber and rare earth-doped fiber with regard to their susceptibility to hydrogen-induced loss increase.

FIG. 1 shows prior art data of $(d\alpha_{OH}/dt)_{initial}$ (the initial rate of fiber loss increase due to OH in the fiber) vs. inverse absolute temperature as presented in U.S. Pat. No. 5,274,734 incorporated herein by reference. The initial rate is a known measure of the susceptibility of a fiber to hydrogen-induced loss. See, for instance, A. Tomita & P. J. Lemaire, "Hydrogen-Induced Loss Increases in Germanium-Doped Single-Mode Optical Fibers: Long-Term Predictions", Electronics Letters, 17$^{th}$ Jan. 1985, Vol. 21, No. 2, pp. 71–72, incorporated herein by reference. The data were obtained by exposing conventional single mode transmission fibers (5 D fiber available from AT&T; curve 10) and single mode Er-doped amplifier fiber (core doping 18% $GeO_2$, 2% $Al_2O_3$ and 200 ppm Er; curve 11) to 1 atmosphere of $H_2$ at various temperatures, and measuring the rate of fiber loss increase at $\lambda \approx 1.4$ $\mu$m. FIG. 1 shows that at 70° C., the initial rate of increase of the 5 D and Er-doped fibers is about $10^{-4}$ and 3 dB/km·hour, respectively, and at 7° C., it is about $3\times10^{-8}$ and $6\times10^{-2}$ dB/km·hour, respectively. FIG. 1 thus clearly demonstrates the huge difference in the susceptibility to hydrogen-induced loss between Ge-doped conventional transmission fiber and Er-doped amplifier fiber, especially at expected operating temperatures (e.g., 3°–70° C.).

Figure 2:
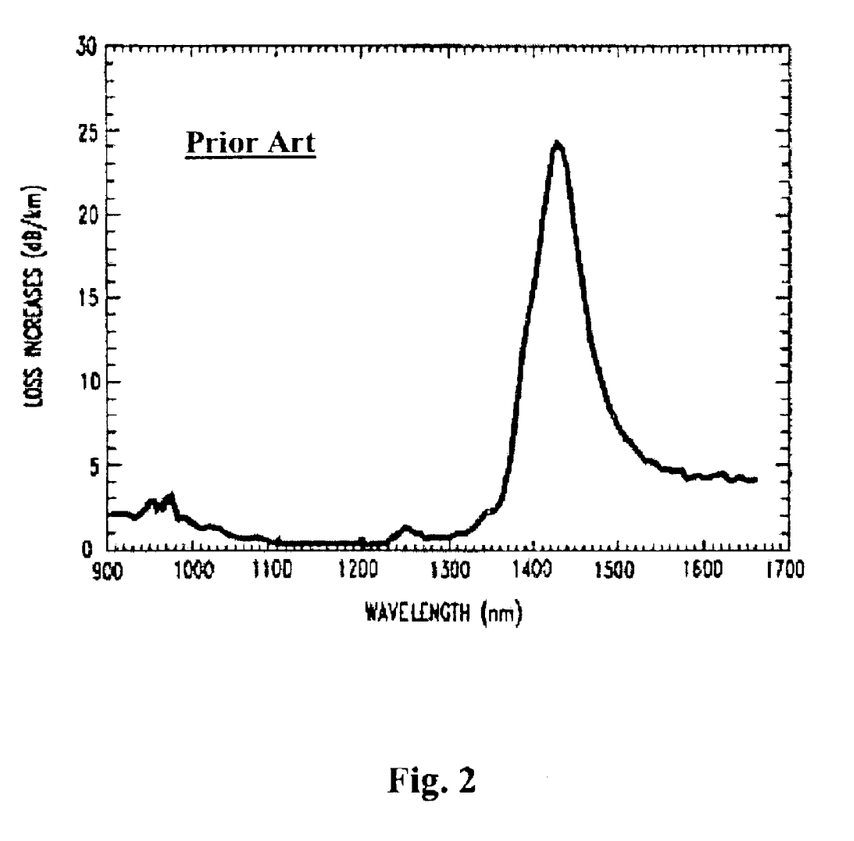
FIG. 2 shows exemplary prior art data on hydrogen-induced loss increase as a function of wavelength.

FIG. 2 shows a hydrogen-induced loss increase in a prior art Er-doped silica-based fiber after 24 hours at 213° C. in $10^{-4}$ atmospheres of $H_2$, as disclosed in U.S. Pat. No. 5,274,734. The fiber has a relatively high doping concentration of germania and was not passivated, and hence quickly depleted by reaction with hydrogen. The main loss peak at about 1.43 $\lambda$m is believed to be due to the formation of OH in the fiber core. It is to be noted that this peak causes significant loss increase at 1.48 $\lambda$m (a possible pump wavelength for Er-doped fiber amplifiers) and at 1.55 $\lambda$m (a likely signal wavelength).

Fiber amplifiers are the most important components for Dense Wavelength Division Multiplexing (DWDM) systems. In order to expand an operational DWDM window, the L-band window (1567–1607 nm) which is longer than the C-band window (1528–1562 nm) was exploited and hence L-band amplifiers gained interest (Susumu Kinoshita, "Broadband fiber optic amplifiers"; OFC 2001 Technical Digest TuA1-1 to TuA1-4). Also well known, typical C-band erbium-doped fiber compositions were highly reactive when exposed to even low levels of ambient hydrogen (P. J. Lemaire et al., "Hydrogen-induced loss increases in hermetic and non-hermetic erbium-doped amplifier fibers", OFC/IOOC '93 Technical Digest TuL3; pp. 53–54). It was found that L-band erbium-doped fiber degraded even faster than C-band erbium-doped fiber due to its higher doping level with erbium and other dopants.

Erbium doped fiber is a single-mode fiber made by creating an Er-doped core surrounded by a cladding which acts as a waveguide. The cladding is usually silica glass. Up to now a $GeO_2$—$Al_2O_3$—$SiO_2$ glass matrix is a popular composition for commercial Er-doped fiber and is accepted by most of the manufacturers in the world. The different doping levels were designed for various EDFA requirements. For L-band Er-doped fiber, Lucent used high $Al_2O_3$ and $GeO_2$ doping concentrations, wherein the $GeO_2$ doping concentration is usually higher than 5 weight % and the cladding is pure silica (Lucent L-band erbium-doped fiber 1480 specification). Because this fiber is very susceptible to hydrogen aging, it has to be passivated by deuterium to meet the lifetime requirements of the Telcordia standard. Corning, traditionally used carbon coating to improve the hydrogen aging behavior of their fibers.

As stated heretofore, erbium-doped fiber is susceptible to long-term degradation caused by hydrogen induced loss increases. AT&T Bell laboratories recognized this phenomenon in 1983 in installed optical fibers. Hydrogen-induced losses are associated with both, dissolved molecular $H_2$ and with species such as OH that are formed when $H_2$ reacts in the fiber core. Although most single mode transmission fibers were found to be relatively unreactive, it was discovered in 1993 that typical erbium-doped fiber compositions were highly reactive when exposed to even low levels of ambient $H_2$. Survey studies showed that this high reactivity is inherent in the most widely used Er fiber compositions based on $GeO_2$—$Al_2O_3$ co-doped host glasses. A similar reactivity has been noted in Er fibers made by different manufactures using different processing techniques. This potential reliability problem has been recognized and is addressed in Telcordia requirements. When Er fiber is exposed to $H_2$, the fiber loss increases. The Ge—OH associated loss increases centered at about 1420 nm are a most prominent effect and cause vibrational losses near 1480 nm. The tail of this absorption peak extends to 1550 nm and 1590 nm. Other hydrogenated defects cause spectrally broad absorptive loss increases, which can also raise losses in the 980 nm pump band. This can have deleterious effects on the performance of an Er-doped fiber amplifier due to the increased losses at signal and pump wavelength.

The extent of the reliability problem for a given application depends on the temperature and hydrogen pressure. $H_2$ impurities are invariably present in fiber cable and amplifier modules, due to outgassing of polymers, corrosion reaction, and the proximity of $H_2$ generating electrochemical cells such as the lead-acid batteries used in repeater huts. $H_2$ levels usually exceed $10^{-4}$ atm. Levels approaching 1 atm have also been documented. Telcordia specifications (TA-NWT001312) require a stable 20 Year long-term performance at a hydrogen pressure of 0.01 atm under 38° C.

The present invention provides an optical fiber with a fiber composition that has an improved resistance to hydrogen-induced loss. Advantageously, the optical fiber in accordance with the present invention has an improved hydrogen resistance without requiring a pre-treatment or passivation step prior to its use. The optical fiber in accordance with the present invention is particularly advantageous for rare earth-doped optical fiber compositions for providing high gain with higher hydrogen resistance. Thus rare earth-doped fiber compositions in accordance with the present invention do not require any additional processing procedures, such as passivation or hermetic coating, to meet the specifications for aging on exposure to hydrogen.

The present invention is based on the finding that the germanium dopant is the primary cause for an increased sensitivity of an optical fiber to hydrogen resulting in hydrogen-induced optical loss. Thus by decreasing the dopant concentration of germanium in the core region of the optical fiber, the resistance of the fiber to hydrogen is increased. In accordance with the present invention, germania is added as a dopant to the core of an optical fiber at a quantity of 0% to 4% in weight.

Furthermore, in accordance with another embodiment of the present invention, a small amount of water of approximately 4.5 ppm to 5.5 ppm is incorporated into the fiber core so as to form OH bonds in the fiber core to increase the resistance of the fiber to the effects of hydrogen.

In accordance with yet another embodiment, a low loss matched cladding is employed to further improve the hydrogen resistance of the optical fiber in accordance with the present invention. The matched cladding has a composition of $SiO_2$—F—$P_2O_5$, wherein the $P_2O_5$ dopant helps to prevent water from reaching the core region of the optical fiber. An $SiO_2$—F—$P_2O_5$ cladding composition has better hydrogen resistance characteristics than a pure silica cladding, such as the one employed in Lucent's pure silica fiber cladding. The matched $SiO_2$—F—$P_2O_5$ cladding of the fiber in accordance with the present invention creates a more definitive barrier to hydrogen and therefore has a slower hydrogen penetration rate than a pure silica cladding. The refractive index of the matched cladding should match silica glass and the F and $P_2O_5$ doping amounts are controlled by crack limitation due to the difference between the core and the silica tube.

In accordance with another embodiment of the present invention, the matched cladding/core thickness ratio is larger than 4:3.

As stated heretofore, the optical fiber composition in accordance with the present invention is particularly advantageous for rare earth-doped fibers, such as fibers doped with erbium, lanthanum, cerium, praseodymium, neodymium, promethium, samarium, europium, gadolinium, terbium, dysprosium, holmium, thulium, and ytterbium. The performance of erbium-doped fiber is very dependent on the composition of the dopants in the core and the fiber design. Table 1 below shows an exemplary composition for an L-band optical fiber in accordance with the present invention.

TABLE 1

| | Core compositions | Cladding compositions |
|---|---|---|
| $SiO_2$ | ~84 wt % | Match cladding |
| $Al_2O_3$ | <12 wt % | two $SiO_2$—F—$P_2O_5$ |
| $GeO_2$ | <4 wt % | with different $P_2O_5$ content |
| $Er_2O_3$ | 1500–2000 ppm | matched Cladding/Core > 4:3 |
| $H_2O$ | ~5 ppm | |

The $SiO_2$ concentration in the core varies in accordance with the concentration of the other dopants in the core. The cladding composition is a matched clad with $SiO_2$—F—$P_2O_5$. As indicated in Table 1 above, different amounts of $P_2O_5$ can be used for doping the cladding. For example, two different compositionally adjacent matched cladding layers can be employed. The two layers have a different $P_2O_5$ content but still maintain the matched clad. If an amount of $P_2O_5$ is varied, an amount of fluorine dopant (F) is adjusted to provide a matched cladding, i.e. the resulting index of refraction of the cladding for a combination of F and $P_2O_5$ is equivalent to the index of refraction of silica ($P_2O_5$ dopant raises the index of refraction and F dopant lowers the index of refraction of silica). Further, the cladding to core ratio indicates the amount of the matched clad. The matched cladding of the example presented in Table 1 is ⅓ larger with respect to the core diameter. Thus, the (Matched Cladding Diameter)/(Core Diameter)>4:3.

Figure 3:
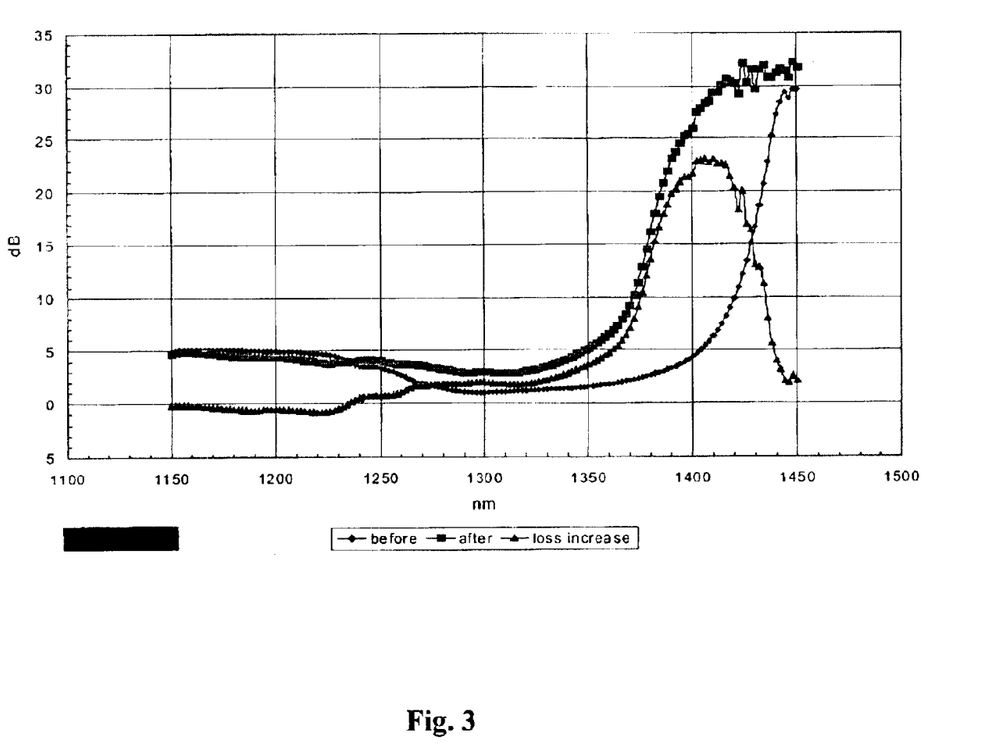
FIG. 3 presents hydrogen aging test results for a Lucent L-band erbium-doped fiber.
Figure 4:
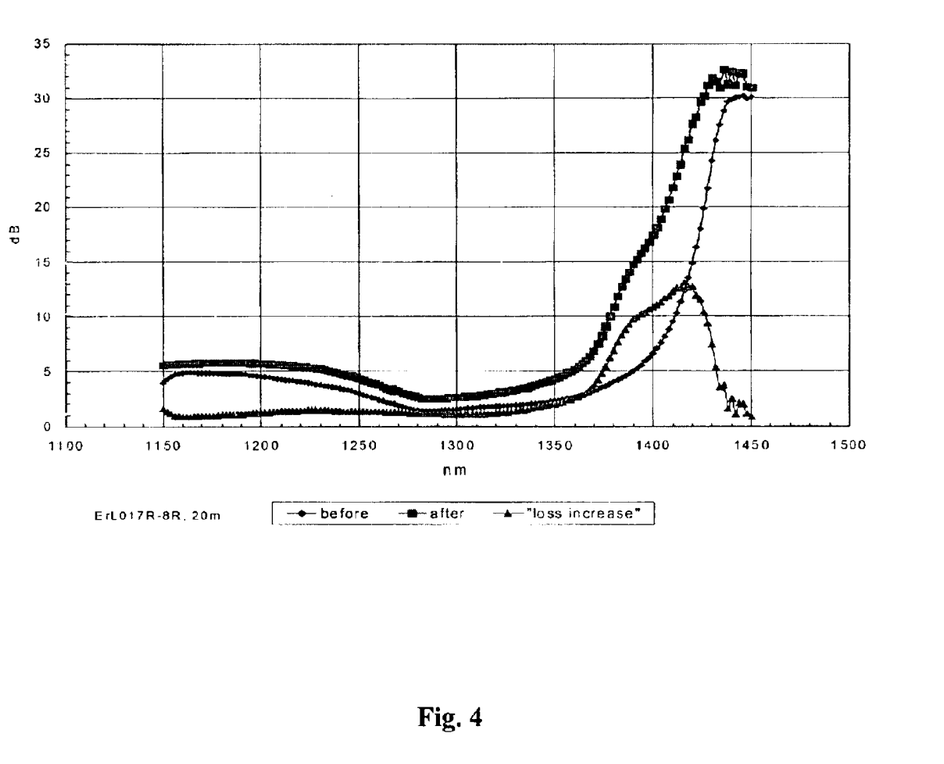
FIG. 4 presents hydrogen aging test results for an L-band erbium-doped in accordance with the present invention.

Turning now to FIGS. 3 and 4, hydrogen aging test results are presented for a Lucent L-band erbium-doped fiber (FIG. 3) and for an L-band erbium-doped fiber (FIG. 4) in accordance with the present invention. Both, Lucent's passivated L-band Er-doped fiber (FIG. 3) and the inventive L-band Er-doped fiber (ErL017) (FIG. 4) were treated under the same conditions at 200° C., 1 atm $H_2$, and 200 hr. FIGS. 3 and 4 show the loss increase at 1420 nm for both fibers. It is apparent that the inventive unpassivated ErL017 fiber has a better hydrogen resistance since its loss increase is only half of Lucent's passivated L-band Er doped fiber MP1480. The lifetime assessment shows that the inventive ErL017 fiber can meet the Telcordia requirements without any passivation treatments.

The results presented in FIGS. 3 and 4 also show almost all of the hydrogen reacts with Ge to form Ge—OH as indicated by the absorption at 1420 nm. This loss peak tail can extend to 1550 nm and decrease the gain of an L-band EDFA. Because the hydrogen aging is related to defect sites and to the Ge concentration, the higher the Ge concentration, the higher the loss increase due to hydrogen. Therefore, a core composition with low or no $GeO_2$ is appropriate for better hydrogen aging of Er-doped fibers. The fewer active Ge defect sites in accordance with the inventive fiber will increase the hydrogen resistance of Er-doped fibers. The fiber in accordance with the present invention (ErL017) also has a slightly higher water content (~5 ppm). This can also improve the hydrogen resistance of an optical fiber when compared to Lucent's drier fiber (MP1480). The small amount of water in the fiber also tends to occupy the defect sites and hence can improve the fiber's hydrogen aging behavior without sacrificing amplifier performance.

In accordance with another embodiment of the invention, the $SiO_2$—F—$P_2O_5$ cladding composition of the inventive fiber provides for improved hydrogen resistance when compared to Lucent's pure silica cladding. The matched cladding composition of the inventive fiber creates a more definitive barrier to hydrogen and therefore has a slower hydrogen penetration rate than a pure silica cladding.

The hydrogen aging tests were done based on a hydrogen aging dynamic modeling and master curve as disclosed by M. J. LuValle et al., "Kinetic modeling of hydrogen induced degradation in erbium doped fiber amplifiers", SPIE Vol. 3848, pp. 260–270, Part of the SPIE Conference on Optical Fiber Reliability and Testing, Boston, Mass., September 1999, which is incorporated herein by reference.

Table 2 below presents a summary of hydrogen aging experiments of erbium-doped fibers from the prior art and erbium-doped fibers in accordance with the present invention. Two overlapping absorption bands are observed in the spectra, one band at 1390 nm Si—OH and one band at 1420 nm Ge—OH. Hence, the loss curve was decomposed into two individual peaks as calculated by the following fitting formula which is disclosed by Emmanuel Desurvire in a book entitled "Erbium-Doped Fiber Amplifiers", which is incorporated herein by reference.

$$I(\lambda) = \sum_i a_i \exp\left\{-4\ln 2 \frac{(\lambda - \lambda_1)^2}{\Delta \lambda_1^2}\right\}$$

TABLE 2

Summary of hydrogen aging of Er-doped fiber @ 200° C., 1 atm $H_2$, 200 hr

| | | 1390 nm (Si—OH) | | 1420 nm (Ge—OH) | | 1240 nm (H2) | |
|---|---|---|---|---|---|---|---|
| | Fiber | Before | Loss increase | Before | Loss increase | Before | Loss increase |
| C-Band | MP980 | <<1 | 2.59 | | 16.06 | | 2.48 |
| | ERC33 | 1.1 | 4.25(2.71) | | 20.48(16.7) | | 4.51 |
| L-Band | MP1480 | <<1 | 6.24 | | 24.38 | | 2.03 |
| | ErL017 | ~1.0 | 2.36(1.14) | | 12.68(12.0) | | 1.35 |

| | | 1480 nm | | 1550 nm | | | |
|---|---|---|---|---|---|---|---|
| | Fiber | before | loss increase | before | loss increase | 1480 nm/ 1420 nm | 1550 nm/ 1420 nm |
| C-Band | MP980 | | | | | | |
| | ERC33 | 134.38 | 7.7 | 145.11 | 4.73 | 0.37(0.45) | 0.23(0.28) |
| L-Band | MP1480 | | | | | | |
| | ErL017 | 213.92 | 5.38 | 205.16 | 2.91 | 0.43(0.45) | 0.23(0.24) |

| | | Background loss | | est. background loss | | | |
|---|---|---|---|---|---|---|---|
| | | (dB/Km) | | 1550 nm (dB/Km)* | | 1590 nm (dB/Km)* | |
| | Fiber | before | After aging | before | After aging | before | After aging |
| C-Band | MP980 | ~4.34 | | ~1.68 | ~18.4 | | |
| | ERC33 | ~3–4 | 54 | ~1.1–1.5 | ~23 | | |
| L-Band | MP1480 | ~3.5 | | | | ~1.50 | ~9.7 |
| | ErL017 | ~6.6 | 18 | | | 2.16 | ~6.3 |

Data is from 20 m fiber testing, data marked with * is from short fiber ~1 m length.
The loss of 1390, 1420, 1240, 1480, 1550 nm is for 20 m fiber length.

The hydrogen aging test results demonstrate that the unpassivated L-band fiber ErL017 in accordance with the invention is particularly resistant to hydrogen aging. Its loss increase is even lower than the loss increase for C-band fiber ErC33 and it further demonstrates a different aging behavior from Lucent's MP1480 fiber. The optical fiber in accordance with the present invention, e.g. ErL017, has fewer germanium defect sites due to its core doping composition. The degradation is mainly attributed to Ge—OH absorption at 1420 nm and to a lesser extent to Si—OH absorption at 1390 nm and molecular hydrogen absorption at 1240 nm. Thus, the test results show that optimizing the core glass composition of Er-doped fiber provides optical fibers with hydrogen resistance without the need of further treatment stages, such as passivation or hermetic coating.

Table 3 presents a summary of hydrogen aging lifetime prediction of L-band Er-doped fibers.

TABLE 3

The hydrogen aging lifetime prediction of L-band Er-doped fibers

| | L-Band | |
| --- | --- | --- |
| | Mp1480 | ErL017 |
| Passivation | yes | no |
| loss increase[20 hr Ave.](dB/m) | 0.122 | 0.192 |
| KT In($\upsilon$ [H2] t) | 1.285 | 1.325 |
| $\upsilon$ HZ/second | $6.56 \times e8$ | $1.09 \times e9$ |
| KT In($\upsilon$ [H2] t) @ Telcordia Req. | 0.96 | 0.983 |
| loss increase @ 1420 nm/25 y (dB/Km) | ~3.5 | ~4.0 |
| loss increase @ 1550 nm/25 y (dB/Km) | ~0.9 | ~1.0 |
| loss increase @ 1590 nm/25 y (dB/Km) | $<10^{-2}$* | $~10^{-2}$* |
| pass qualification | pass | pass |
| loss increase[40 hr Ave.](dB/m) | 0.244 | 0.238 |
| KT In($\upsilon$ [H2] t) | 1.365 | 1.36 |
| $\upsilon$ | $2.3 \times e9$ | $4.17 \times e9$ |
| KT In($\upsilon$ [H2] t) @ Telcordia Req. | 1.003 | 1.019 |
| loss increase @ 1420 nm/25 y (dB/Km) | ~4.0 | ~4.0 |
| loss increase @ 1550 nm/25 y (dB/Km) | ~1.0 | ~1.0 |
| loss increase @ 1590 nm/25 y (dB/Km) | $<10^{-2}$* | $<10^{-2}$* |
| pass qualification | pass | pass |

*This loss does not include SLE (short wavelength loss edge) and LLE (long wavelength loss edge) losses caused by dissolved molecular hydrogen The above described embodiments of the invention are intended to be examples of the present invention and numerous modifications, variations, and adaptations may be made to the particular embodiments of the invention without departing from the spirit and scope of the invention, which is defined in the claims.

What is claimed is:

1. An optical fiber comprising:
  a core region, said core region comprising silica as a major component and at least a first dopant, wherein said first dopant is germania ($GeO_2$) in a quantity of substantially 4% or less in weight; and
  a cladding region surrounding said core region, said cladding region being composed of silica as a major component.

2. The optical fiber as defined in claim 1 wherein the core region further comprises at least a second dopant.

3. The optical fiber as defined in claim 2 wherein the second dopant is one of alumina and a rare earth.

4. The optical fiber as defined in claim 1 wherein the cladding region comprises at least a first dopant.

5. The optical fiber as defined in claim 1 wherein said core region further comprises water.

6. The optical fiber as defined in claim 1 wherein a cladding diameter to a core diameter is larger than 4 to 3.

7. An optical fiber comprising:
  a core region, said core region comprising silica as a major component and at least a first dopant, wherein said first dopant is germania ($GeO_2$) comprising a quantity of substantially 0% to 4% in weight; and
  a cladding region surrounding said core region, said cladding region being composed of silica as a major component, wherein the cladding region comprises at least a first dopant, and, wherein the first dopant of the cladding is one of fluorine and phosphorous.

8. An optical fiber for resisting a hydrogen-induced loss comprising:
  a silica glass cladding; and
  a glass core doped with at least a first dopant, said first dopant is germania having a dopant concentration in a quantity of substantially 4% or less in weight.

9. The optical fiber as defined in claim 8 wherein said glass core further comprises at least a second dopant.

10. The optical fiber as defined in claim 9 wherein the second dopant is alumina.

11. The optical fiber as defined in claim 9 wherein the second dopant is a rare earth ion for providing an optical amplification.

12. An optical fiber for resisting a hydrogen-induced loss comprising:
  a silica glass cladding; and
  a glass core doped with at least a first dopant, said first dopant is germania having a dopant concentration from approximately 0% to 4% in weight, wherein the silica glass cladding is a matched cladding further comprising fluorine and phosphorous as dopants.

13. An optical fiber for resisting a hydrogen-induced loss comprising:
  a) a core comprising:
    silica ($SiO_2$),
    germania ($GeO_2$) at a quantity of up to approximately 4% in weight, and
    alumina ($Al_2O_3$); and
  b) a matched cladding formed around the core comprising silica doped with fluorine (F) and phosphorous ($P_2O_5$).

14. The optical fiber as defined in claim 13 wherein the core further comprises a rare earth dopant for providing optical amplification.

15. The optical fiber as defined in claim 14 wherein the rare earth dopant is erbium oxide ($Er_2O_3$) at a quantity of approximately 1500 to 2000 ppm.

16. The optical, fiber as defined in claim 13 wherein the core further comprises an amount of water at a quantity of approximately 4.5 ppm to 5.5 ppm.

17. The optical fiber as defined in claim 13 wherein a matched cladding diameter to a core diameter is larger than 4 to 3.

18. The optical fiber as defined in claim 13 wherein the core comprises silica at a quantity of at least approximately 84% in weight.

19. The optical fiber as defined in claim 13 wherein the core comprises alumina at a quantity of less than 12% in weight.

* * * * *